United States Patent
Taylor et al.

(12) 
(10) Patent No.: US 6,180,744 B1
(45) Date of Patent: Jan. 30, 2001

(54) MOISTURE CURING HOT MELT ADHESIVES

(75) Inventors: Alan Taylor; Julie Anne Thompson, both of Nr. Accrington (GB)

(73) Assignee: Baxenden Chemicals Limited, Lancashire (GB)

(*) Notice: Under 35 U.S.C. 154(b), the term of this patent shall be extended for 0 days.

(21) Appl. No.: 09/171,263

(22) PCT Filed: Apr. 18, 1997

(86) PCT No.: PCT/GB97/01084

§ 371 Date: Nov. 13, 1998

§ 102(e) Date: Nov. 13, 1998

(87) PCT Pub. No.: WO97/40083

PCT Pub. Date: Oct. 30, 1997

(30) Foreign Application Priority Data

Apr. 19, 1996 (GB) .................................................. 9608181

(51) Int. Cl.⁷ .......................... C08G 18/42; C09J 175/06; C09J 5/06
(52) U.S. Cl. ..................... 528/59; 156/331.4; 156/331.7; 528/73; 528/80; 528/81; 528/83; 528/905
(58) Field of Search .............................. 156/331.4, 331.7; 528/73, 80, 83, 905, 59, 81

(56) References Cited

U.S. PATENT DOCUMENTS 5,478,910  12/1995  Russell et al. ....................... 528/274

FOREIGN PATENT DOCUMENTS

| 344912 | * 12/1989 | (EP) . |
| 2 272 904 | 6/1994 | (GB) . |
| WO 94 12652 | 6/1994 | (WO) . |

OTHER PUBLICATIONS

Macromolecules 1995, 28, 1229–1232, "Matrix–Assisted Laser Desorption/Ionization Time–Of–Flight Mass Spectrometry Characterization of Poly)butyl methacrylate) Synthesized by Group–Transfer Polymerization".

* cited by examiner

*Primary Examiner*—Rabon Sergent
(74) *Attorney, Agent, or Firm*—Nixon & Vanderhye

(57) ABSTRACT

A composition containing at least one isocyanate terminated polyester obtainable by enzyme catalyzed polyesterification of one or more monomers selected from dicarboxylic acids, diols or polyols and/or hydroxyacids in the presence or absence of an inert organic solvent and a diisocyanate.

18 Claims, No Drawings

MOISTURE CURING HOT MELT ADHESIVES

The present invention relates to compositions suitable for use as moisture curing hot melt adhesives.

The technology of hot melt adhesives and moisture curing hot melt adhesives is well known. Conventional hot melt adhesives are thermoplastic materials. They are applied molten at high temperatures and the adhesion comes entirely from the cooling of the material back to the solid state. Hot melt adhesives set immediately upon cooling from the liquid to the solid state, but may develop improved properties over minutes or days with crystallization. The two main drawbacks of this type of adhesive are the very high application temperatures, limiting the type of substrate, and the poor heat resistance of the final adhesive bond as reheating will again soften the material.

Moisture curing polyurethane hot melt adhesives have been developed to improve performance in these areas. These materials are polyester based and have terminal isocyanate groups which, after application, utilize the moisture in the air to cure (set) to produce a more heat resistant bond.

The molecular weight, and hence viscosity, of the polyurethanes used in moisture curing hot melt adhesives is significantly lower than that of the conventional thermoplastics used in conventional hot melt adhesives. This allows application of moisture curing hot melt adhesives at much lower temperatures, for example 120° C., compared to 160° C. for conventional hot melt adhesives, which causes much less damage to substrates. However, the lower molecular weight of the polyurethanes used in the moisture curing hot melt adhesives gives rise to other problems. Prior to any moisture curing taking place, moisture curing polyurethanes form an initial bond much more slowly than conventional hot melt adhesives, therefore the "green strength" (bond strength immediately after application) is lower.

The present invention seeks to overcome the problems of traditional moisture curing hot melt adhesives. The inventors have developed moisture curing hot melt adhesives with more rapid solidification and therefore greater "green strength" than other moisture curing hot melt adhesives on the market.

The present invention provides a composition, suitable for use as a moisture curing hot melt adhesive. The compositions of the present invention comprise at least one isocyanate terminated polyester obtainable by enzyme catalysed polyesterification of one or more monomers selected from dicarboxylic acids, diols or polyols and/or hydroxyacids in the presence or absence of an inert organic solvent and reacting the product with a diisocyanate and optionally at least one conventionally produced isocyanate terminated polyester. Preferably the diisocyanate is MDI (4,4'-diphenylmethane diisocyanate).

It is possible for isocyanate terminated polyesters used in the composition of the invention to be 100% polyester(s) obtained by enzyme catalysed polyesterification. However, it has been found that when up to 60% by weight of the polyester(s) are conventional polyester(s) the performance and physical properties of the composition are improved. Preferably at least 40% by weight, more preferably at least 50% by weight, more preferably at least 60% by weight, even more preferably at least 70% by weight, still more preferably at least 80% by weight and most preferably at least 90% by weight of the polyester(s) used are produced by enzyme catalysed polyesterification.

The composition may also contain additives conventionally present in moisture curing hot melt adhesives, for example antioxidants, oxazolidine, crosslinking agents and catalysts, in an amount of up to 5 parts per hundred (pph) of the overall composition per additive component.

The polyesters used in the composition of the invention may be produced by processes, such as those described in GB-A-2272904 and PCT/GB93/02461, involving an enzymatic polyesterification, either in the presence or absence of an organic solvent, which affords polyesters having high weight average molecular weight and low dispersity whilst also being extremely pure in terms of freedom from unwanted by-products. Polyesters produced by this process comprise as repeating units (i) residues of at least one aliphatic hydroxycarboxylic acid, or derivative thereof; or (ii) residues of (a) at least one aliphatic dicarboxylic acid or derivative thereof, (b) at least one aliphatic diol or polyol, and optionally (c) at least one aliphatic hydroxycarboxylic acid, or derivative thereof.

The process comprises reacting the components defined in (i) or the components defined in (ii) in the presence or absence of a solvent and in the presence of a lipase such that the molar ratio of acid groups to hydroxyl groups in the reactants is 1:1 to 1:1.1.

As used herein the term "polyester" is intended to encompass materials obtainable by this process from any suitable combination of the monomers defined herein.

Aliphatic hydroxycarboxylic acids suitable for use in this process include those of formula:

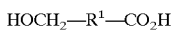

$$HOCH_2-R^1-CO_2H$$

wherein $R^1$ is a bond or a divalent radical of a substituted or unsubstituted $C_1$ to $C_{12}$ alkyl group optionally having one or more carbon—carbon double bonds and optionally having one or more carbon—carbon triple bonds.

Suitable aliphatic dicarboxylic acids include those of formula:

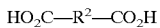

$$HO_2C-R^2-CO_2H$$

wherein $R^2$ is a bond or a divalent radical defined as for $R^1$.

Suitable aliphatic diols include those of formula:

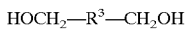

$$HOCH_2-R^3-CH_2OH$$

wherein $R^3$ may be a bond or a divalent radical defined as for $R^1$.

Suitable aliphatic polyols include those of formula:

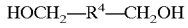

$$HOCH_2-R^4-CH_2OH$$

wherein $R^4$ is a divalent radical defined as for $R^1$ and bearing at least one hydroxyl substituent.

Each of the $C_1$ to $C_{12}$ alkyl groups mentioned above may be substituted or unsubstituted and may be cyclic, branched or straight chain, optionally having at least one carbon—carbon double bond, either in the cis- or trans-conformation and optionally having at least one carbon—carbon triple bond. When the $C_1$ to $C_{12}$ alkyl group has more than one double or triple carbon-carbon bond, these bonds may be conjugated or non-conjugated. The $C_1$ to $C_{12}$ alkyl group is optionally substituted with one or more substituents (which, when there are two or more substituents, may be the same or different) each selected from halogen atoms, for example, fluorine, chlorine or bromine, hydroxyl, —OR5 where $R^5$ is hydrogen or a $C_1$ to $C_{12}$ alkyl, carboxyl, and —$CO_2R^6$ where $R^6$ is hydrogen or a $C_1$ to $C_{12}$ alkyl.

Preferably the diol has from 2 to 14 carbon atoms and is an α,ω-diol, for example 1,4-butanediol, diethylene glycol, ethylene glycol, propylene glycol, pentanediol, hexane-1,6-diol or dodecane-1,12-diol, most preferably 1,4-butanediol.

Diethylene glycol has a lower activity than other suitable diols so that, when diethylene glycol is used as a monomer, it is necessary to carry out the reaction either at higher temperature, in which case the dispersity is relatively wide, or at low temperature for a long period.

Preferably the diacid has from 2 to 14 carbon atoms, for example, oxalic acid, succinic acid, fumaric acid, citric acid, malic acid, malonic acid, maleic acid or adipic acid. Most preferably the diacid is adipic acid.

The hydroxy acids must have a non-sterically hindered primary or secondary hydroxyl. Tertiary hydroxyl and sterically hindered primary and secondary hydroxyls are unlikely to react under the conditions of the enzyme catalysed process. Preferred hydroxy acids are hydroxy-straight chain aliphatic carboxylic acids, At high dilution certain hydroxy carboxylic acids tend to form lactones and it is therefore preferred that, when such hydroxy acids are used in the enzyme catalysed process, they are used only in high concentration in order to avoid the unwanted lactonisation reaction.

Preferably the hydroxycarboxylic acid has from 2 to 14 carbon atoms, for example glycolic acid, lactic acid, 2-hydroxybutyric acid, 2-hydroxy isobutyric acid, 2-hydroxy caproic acid, 2-hydroxy isocaproic acid, citric acid or malic acid.

As used herein the term "carboxylic acid derivative" refers to esters and acid anhydrides. An ester of a diacid may be a monoester or a diester, for example a mono or dialkyl ester. Preferably the alkyl groups are each of 1 to 4 carbon atoms, and more preferably the derivative is a methyl or ethyl ester or diester, most preferably methyl adipate or dimethyl adipate.

The polyols used herein have at least three hydroxyl groups of which at least two must be non-sterically hindered primary or secondary hydroxyl groups. Preferably the polyol has 3, 4 or 5 hydroxy groups. Tertiary hydroxyl and sterically hindered primary and secondary hydroxyls are unlikely to react under the conditions of the enzyme catalysed process but will nevertheless provide branch points when subsequently reacted with isocyanates. Suitable polyols include trimethylolpropane, pentaerythritol and triols, especially glycerol. Use of glycerol generally results in a linear polymer as the enzyme preferentially esterifies the primary hydroxyls, the secondary hydroxyl being sterically hindered, but branched products may be obtained using certain enzymes.

Owing to the low temperatures used in this process compared with those of conventional chemically catalysed polyesterifications, it is possible to use diacids and hydroxyacids, such as oxalic acid, lactic acid and glycolic acid, which decarboxylate-at elevated temperatures and it is thereby possible to produce polyesters not generally accessible by other methods.

In one embodiment the polyesters produced by this process may consist of repeating units of one or more hydroxyacids.

In alternative embodiments the polyesters produced by this process may comprise or consist of repeating units of a diacid and a diol; a diacid and a polyol; a diacid, a diol and a polyol; a diacid, a diol and a hydroxy acid; a diacid, a polyol and a hydroxy acid; a diacid, a diol, a polyol and a hydroxy acid, or any other suitable combination of monomers, for example combinations in which the diacid is replaced by its methyl ester or ethyl ester derivative. Preferred combinations of monomers are dimethyladipate/1,4-butanediol, adipic acid/glycerol, adipic acid/1,4-butanediol, adipic acid/diethylene glycol, adipic acid/diethylene glycol/glycerol, adipic acid/diethylene glycol/trimethylolpropane, diethylene glycol/adipic acid/dimethylolpropane, adipic acidil,6-hexanediol.

The reactive carboxylic acid groups and reactive hydroxy groups of the reactants are generally present in substantially equal numbers. The reaction may be carried out with a stoichiometric imbalance, but this generally results in a product having a lower weight average molecular weight than if the reactants are used in equimolar amounts. However the proportions may be adjusted slightly such that a polyester having a predominance of terminal hydroxy units is obtained. In general the molar ratio of acid groups to hydroxyl groups should be from 1:1 to 1:1.1.

In the case where the resulting polymer is to have a predominance of terminal hydroxy groups the length of the polymer may be varied by varying the excess of hydroxyl present in the initial reaction mixture. For example, increasing the amount of hydroxyl groups relative to the number of acid groups in the reaction mixture will give rise to polymers of shorter chain length.

For further details of the enzymes and substrates which may be used see GB-A-2272904 and PCT/GB94/02461. When the polyesterification is carried out in the absence of a solvent the preferred enzyme is the lipase derived from *Candida antarctia*. When the polyesterification is carried out in a solvent the preferred enzyme is the lipase derived from *Mucor miehei*.

The activity of the enzyme may be affected by materials present in the reaction mixture, for example the lipase from *C.antarctica is* inhibited by glycerol. It is preferable not to include branched polyfunctional monomers, particularly secondary alcohols, in the initial reaction mixture, but to delay their addition until after the reaction is started to avoid reducing enzyme activity. Preferably branched polyfunctional monomers are not added to the reaction mixture until after the enzyme has been removed, for example after completion of the initial oligomerisation step. If a branched polyfunctional monomer is added to the reaction mixture at least 12 hours, for example at least 14 hours, 16 hours or 24 hours after the start of the reaction, when the enzyme is still present in the reaction mixture the enzyme activity will be reduced, but not completely, and the reaction will continue at a slower rate than if the branched polyfunctional monomer had not been added.

The polyesters produced by this process generally have a minimum weight average molecular weight of 200 Da, preferably 600 Da, more preferably 1000 Da and most preferably 4 kDa. The weight average molecular weight of the polyester is measured using gel permeation chromatography.

The polyesters produced by this process generally comprise from 6 to 50 monomer units, preferably from 10 to 40 monomer units and most preferably from 30 to 40 monomer units. Generally it has an acid number of from 0 to 50, preferably from 0 to 25 and more preferably from 0.5 to 10. Most preferably the polyester has an acid number of about 1.

The polyesters produced by this process generally have a dispersity of 2 or less, preferably 1.5 or less, more preferably 1.3 or less. The dispersity is calculated as follows:

$$\text{Dispersity, } d = \frac{\text{Weight Average Molecular Weight}}{\text{Number Average Molecular Weight}}$$

and the number and weight average molecular weights may be obtained by conventional methods.

Whilst the enzymatic processes described above are preferred for production of the polyesters, any other process which produces polyesters having properties obtainable by the enzymatic process, may also be used.

The polyesters used in the present invention may be linear or branched. Branched polymers and linear polymers having pendant hydroxyl groups (which can act as branch points and lead to crosslinking on subsequent processing) are generally formed by introducing a small percentage of a branched polyfunctional monomer such as trimethylolpropane (TMP), dimethylol-propanoic acid (DMPA), pentaerythritol (PE) or glycerol. Incorporation of such monomers gives rise to both linear and branched polyesters.

For use in the present invention the polyesters, especially those having hydroxy terminal groups, are further reacted with at least one isocyanate to produce polyurethanes. Generally the enzyme is removed from the polyester before the reaction with isocyanate. This prevents the enzyme and its support from interfering with the polyester/isocyanate reaction. Generally water produced during the polyesterification is removed before reaction with isocyanate.

Suitable isocyanates have the general formula:

wherein $R^7$ is an m valent aliphatic, cycloaliphatic, heterocyclic or aromatic residue and m is 1 or 2. $R^7$ is preferably a divalent radical of formula:

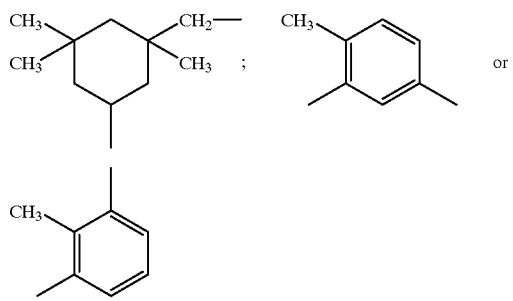

The isocyanate compound may be, for example, ethylene diisocyanate, propylene diisocyanate, tetramethylene diisocyanate, hexamethylene diisocyanate, decamethylene diisocyanate, dodecamethylene diisocyanate, 2,4,4-trimethylhexamethylene-1,6-diisocyanate, phenylene diisocyanate, tolylene or naphthylene diisocyanate, 4,4'-methylene-bis(phenylisocyanate), 4,4'-ethylene-bis(phenylisocyanate), ω,ω'-diisocyanato-1,3-dimethylbenzene, ω,ω'-diisocyanato-1,4-dimethylcyclohexane, ω,ω'-diisocyanato-1,4-dimethylbenzene, ω,ω'-diisocyanato-1,3-dimethylcyclohexane, 1-methyl-2,4-diisocyanato cyclohexane, 4,4'-methylene-bis(cyclohexylisocyanate), 3-isocyanato-methyl-3,5,5-trimethylcyclohexyl isocyanate, dimer acid-diisocyanate, ω,ω'-diisocyanato-diethyl benzene, ω,ω'-diisocyanatodimethyl toluene, ω, ω'-diisocyanato-diethyl toluene, fumaric acid-bis (2-isocyanatoethyl) ester or 1,4-bis-(2-isocyanato-prop-2-yl) benzene, 1,3-bis-(2-isocyanatoprop-2-yl)benzene.

It is essential that the polyesters used for the moisture curing hot melt adhesive compositions of the present invention have a hydroxyl value range of 5 to 110 mg. KOH/g, preferably 10 to 56 mg. KOH/g.

The polyurethanes used in the current invention generally have a NCO/OH ratio of 1.2 to 12, preferably 1.5 to 5.0.

The polyesters used in these polyurethanes have sharp melting points (unlike previously produced materials with wide dispersity) and impart to the polyurethanes excellent physical properties such as desirable combinations of hardness and flexural and tensile strength.

Compositions comprising one of the above polyurethanes have a viscosity of from 1 to 30, preferably 2 to 1S, for instance 2 to 4 Pa.s at 120° C. Compositions with viscosities in this range, when used as moisture curing hot melt adhesive, have an application temperature of 80 to 200° C. more preferably 100 to 150° C.

Polyesters produced by the enzyme technology of GB-A-2272904 and PCT/GB93/02461 exhibit a higher degree of crystallinity than conventionally produced polyesters. A higher degree of crystallinity leads to a better green strength in the adhesive. The setting time for the compositions of this invention depend on the substrate and the ambient conditions.

The Examples below are included to illustrate the invention and is in no way intended to limit the scope of the invention.

EXAMPLE 1

Product A

Premelted pure 4,4'diphenyl methane diisocyanate (100 g) was quickly added to a premelted mixture of polyesters (conventional polyester: based on hexane adipate and having a hydroxyl value (OHv) of 28 (160 g); enzymatic polyester: based on hexane adipate and having a hydroxyl value (ORv) of 17 (740 g)) in a vessel equipped with nitrogen. The mixture was warmed to 75–80 ° C. and the reaction was carried out for approximately 2 hours until an isocyanate value of 2.0% was achieved.

The resulting product, product A, comprised:
 4,4'-diphenyl methane diisocyanate 10 wt %;
 conventional polyester (based on hexane adipate having an OHv of 28) 16 wt %;
 enzymatic polyester (based on hexane adipate having an OHv of 17) 74 wt %.

Comparative Example 1

Product B

Premelted pure 4,4'diphenyl methane diisocyanate (130 g) was quickly added to the premelted polyester (conventional polyester: based on hexane adipate and having a hydroxyl value of 28 (870 g)) in a vessel equipped with nitrogen. The mixture was warmed to 75–80 ° C. and the reaction was carried out for approximately 2 hours until an isocyanate value of 2.0% was reached.

The resulting product, product B, comprised:
 4,4'-diphenyl methane diisocyanate 13 wt %;
 conventional polyester (based on hexane adipate and having an OHv of 28) 87 wt %

The products of Example 1 and Comparative Example 1 were tested by conventional techniques, the results of which are set out below.

Shear Strength

The shear strength may be measured in accordance with British Standard BS 5350 Part CS (1990)

Solidification Time

Samples of Product A and Product B were placed in an oven (at 100° C.) until they were molten. Glass slides and a coating block were also warmed (to 100° C.). Films (200 m) were then cast onto the warmed glass slides. The time for the sample to solidify was measured.

| Results   | Ester Type                           | Solidification time |
|-----------|--------------------------------------|---------------------|
| Product B | conventional                         | 7 min 58 sec        |
| Product A | blend of enzymatic and conventional  | 3 min 52 sec        |

Crystallinity of Products

The crystallinity of product A and product B was measured by Differential Scanning Calorimetry (DSC) and Wide Angle x-ray Diffraction (WAXD). The results of both these studies showed that product A has a higher degree of crystallinity that product B.

EXAMPLE 2

Product C

Pre melt and charge polyester (1144 g enzymatic polyester having a hydroxyl value (OHv)=34.4 based on hexane adipate-AJH 1/151-0). Heat to 60–100° C. and apply vacuum to reduce water content to <0.05% if necessary, then allow to cool to <40° C. Add premelted 4,4'diphenyl methane diisocyanate (158 g) and warm to 75–80° C. and hold for approximately 2 hours until an isocyanate value of 1.7% is reached.

Comparative Example 2—Product D

Pre melt and charge polyester (1317 g conventional polyester having a hydroxyl value (OHv)=30.5 based on hexane adipate). Heat to 60–100° C. and apply vacuum to reduce water content to <0.05% if necessary, then allow to cool to <40° C. Add premelted 4,4' diphenyl methane diisocyanate (161 g) and warm to 75–80° C. and hold for approximately 2 hours until an isocyanate value of 1.7% is reached.

The products of Example 2 and Comparative Example 2 were tested by conventional techniques as described below.

Material Characteristics

| Product              | C                   | D                       |
|----------------------|---------------------|-------------------------|
| Type                 | Enzymatic polyester | Conventional polyester  |
| Viscosity at 120° C. | 15,700 cps          | 13,700 cps              |
| % NCO                | 1.66                | 1.69                    |
| OH value of Polyester| 34.4                | 30.5                    |
| Reaction index       | 1.8                 | 1.8                     |

Lap Shear Tests

5 Minute Test

Samples were warmed to 125° C. for 4 hours to ensure constant temperature throughout the sample. The coating bar was also warmed. The substrate was coated with sample to approx. 150 μm (subject to expansion of the bar at elevated temperature). The substrates were placed together immediately and a weight of 1 kg was applied to the sample and left at room temperature for 4 minutes. A further minute was allowed for placing the sample in the tensometer jaws.

| Substrate: | Beech wood to BS5350 part C5 moisture content - 9.83% (spec - 12 ± 2.5%) Conditioned for 24 Hours at 50% relative humidity, 22 ± 2° C. |
|---|---|

Open time 2–3 seconds. Testing was carried out to BS5350 part C5 1990, results are given below quoted in Newtons.

In general the mode of failure in the 5 minute test was cohesive.

24 Hour Test

Lay up as above but samples were left for at least 24 hours in humidity cabinent 23±2° C. 500 RH.

In general the mode of failure in the 24 hour test was cohesive with some of the higher shear strengths showing wood failure.

|                    | 5 Minute Test |          | 24 Hour Test |          |
|--------------------|---------------|----------|--------------|----------|
| Product            | C             | D        | C            | D        |
| sample number      |               |          |              |          |
| 1                  | 999.2         | 837.7    | 3184.2       | 3363.2   |
| 2                  | 1282.2        | 877.4    | 4065.6       | 2850.4   |
| 3                  | 1047.6        | 786.5    | 3636.5       | 2354.7   |
| 4                  | 1319.9        | 802.3    | 3502.4       | 4085.5   |
| 5                  | 1357.4        | 691.4    | 3478         | 5009.9   |
| 6                  | 1569.9        | 941.8    | 1022.1       | 4015.4   |
| 7                  | 1297.7        | 1056.6   | 4567.4       | 2897.5   |
| 8                  | 1227.2        | 647.3    | 4155.3       | 4817.3   |
| 9                  | 1115.8        | 479.8    | 5262.4       | 4154.4   |
| 10                 | 1034.1        | 1011     | 3931.7       | 3164.1   |
| 11                 | 1121.8        | 563.6    | 2386.8       | 3919.4   |
| 12                 | 1319.2        | 915.6    | 2587.5       | 4129.7   |
| 13                 | 1070          | 629.8    | 5315.5       | 4365.6   |
| 14                 | 1127.9        | 884.3    | 4004         | 3961     |
| 15                 | 1306.9        | 910.8    | 3524.3       | 4342.4   |
| 16                 | 1379.4        | 789.4    | 3925.8       | 2590.3   |
| 17                 | 1572.4        | 771.6    | 4730.2       | 2433.1   |
| 18                 | 1242.6        | 748.4    | 3105.2       | 3978.1   |
| 19                 | 1406.2        | 740.6    | 4645.1       | 3154.7   |
| 20                 | 921.3         | 705.6    | 4807.5       | 3716.1   |
| 21                 | 1280          | 630.1    | 4019         | 3361.9   |
| 22                 | 1098.2        | 942.9    | 3020.9       | 5559.4   |
| 23                 | 1238.5        | 853.3    | 4442.9       | 4389.3   |
| 24                 | 1180.6        | 859.1    | 3902.1       | 4505.1   |
| 25                 | 1140.8        | 896.5    | 3893.4       | 5329.7   |
| 26                 | 937.3         | 838.2    | 2453.4       | 3395.4   |
| 27                 | 991.5         | 1086.1   | 4239         | 3160.6   |
| 28                 | 1135.5        | 808.1    | 3938.5       | 4777.1   |
| 29                 | 1532.2        | 380.1    | 2684.2       | 3278.5   |
| 30                 | 1294.3        | 378.4    | 3539         | 2471.2   |
| Number             | 30            | 30       | 30           | 30       |
| Max                | 1572.4        | 1086.1   | 5315.5       | 5559.4   |
| Min                | 921.3         | 380.1    | 3732.33      | 2433.1   |
| Average            | 1218.253      | 782.1433 | 3732.33      | 3784.367 |
| Standard Deviation | 174.7831      | 176.3752 | 919.5151     | 865.6659 |

What is claimed is:

1. A moisture curing hot melt adhesive composition, which composition comprises at least one isocyanate-terminated polyester, wherein at least 40% by weight of all isocyanate-terminated polyesters present in the composition are obtained by enzyme catalyzed polyesterification, in the presence or absence of an inert organic solvent, followed by reaction of the polyester with a disocyanate, wherein the polyesters obtained by enzyme catalysed polyesterification comprise as repeating units:
 (i) residues of at least one aliphatic hydroxycarboxylic acid having a least one non-sterically hindered primary or secondary hydroxyl or an ester or anhydride thereof; or
 (ii) residues of (a) at least one aliphatic dicarboxylic acid, ester or anhydride thereof, (b) at least one aliphatic diol, or aliphatic polyol having at least two non-sterically hindered primary or secondary hydroxyls, and optionally (c) at least one aliphatic hydroxycarboxylic acid having at least one non-sterically hindered primary or secondary hydroxyl, or an ester or anhydride thereof;

and wherein the isocyanate-terminated polyesters are obtained from polyesters having a hydroxyl value of 5 to 110 mg. KOH/g.

2. A composition according to claim 1 wherein the diisocyanate is 4,4'-diphenylmethane diisocyanate (MDI).

3. A composition according to claim 1 additionally comprising one or more of
 a) an antioxidant;
 b) oxazolidine;
 c) a crosslinking agent, and d) a catalyst
in an amount of up to 5 parts per hundred (pph) (by weight) of the overall composition per additional component.

4. A composition according to claim 1 wherein the isocyanate terminated polyester is linear 1,6-hexane adipate.

5. A composition according to claim 1 wherein the polyester(s) have terminal isocyanate groups and a NCO/OH ratio of 1.2:1 to 12:1.

6. A composition according to claim 1 wherein the viscosity of the composition is from 1 to 30 Pa.s at 120° C.

7. A composition according to claim 1, wherein at least 50% by weight of all isocyanate-terminated polyesters present in the composition are obtained by enzyme catalyzed polyesterification.

8. A composition according to claim 7 wherein the diisocyanate is 4,4'-diphenylmethane diisocyanate (MDI).

9. A composition according to claim 7 wherein the isocyanate terminated polyester is linear 1,6-hexane adipate.

10. A composition according to claim 7 wherein the polyester(s) have terminal isocyanate groups and a NCO/OH ratio of 1.2:1 to 12:1.

11. A composition according to claim 8 wherein the isocyanate terminated polyester is linear 1,6-hexane adipate.

12. A composition according to claim 8 wherein the polyester(s) have terminal isocyanate groups and a NCO/OH ratio of 1.2:1 to 12:1.

13. A composition according to claim 9 wherein the polyester(s) have terminal isocyanate groups and a NCO/OH ratio of 1.2:1 to 12:1.

14. A composition according to claim 7 wherein the viscosity of the composition is from 1 to 30 Pa.s at 120° C.

15. A composition according to claim 7 additionally comprising one or more of
 (a) an antioxidant;
 (b) oxazolidine;
 (c) a cross-linking agent; and
 (d) a catalyst
in an amount of up to 5 parts per hundred (pph) (by weight) of the overall composition per additional component.

16. A composition according to claim 14 additionally comprising one or more of
 (a) an antioxidant;
 (b) oxazolidine;
 (c) a cross-linking agent; and
 (d) a catalyst
 in an amount of up to 5 parts per hundred (pph) (by weight) of the overall composition per additional component.

17. A composition according to claim 16 wherein the diisocyanate is 4,4'-diphenylmethane diisocyanate (MDI) and the isocyanate terminated polyester is linear 1,6-hexane adipate and the polyester(s) have terminal isocyanate groups and a NCO/OH ratio of 1.2:1 to 12:1.

18. A process of adhering two substrates which comprises applying a composition according to claim 1 at a temperature from 80 to 200° C. to at least one of said substrates and bringing said substrates into contact.

* * * * *